United States Patent [19]

Kurscheid

[11] 4,134,567
[45] Jan. 16, 1979

[54] APPARATUS FOR FORMING FANS

[76] Inventor: Gerd Kurscheid, 13 Alfred-Keller-Str., 5200 Siegburg, Fed. Rep. of Germany

[21] Appl. No.: 716,844

[22] Filed: Aug. 23, 1976

[30] Foreign Application Priority Data

Aug. 28, 1975 [DE] Fed. Rep. of Germany ....... 2538270

[51] Int. Cl.² .................. B28B 21/42; B29C 27/22
[52] U.S. Cl. ........................................ 249/83; 425/123
[58] Field of Search ............. 249/91, 83; 29/156.8 R, 29/156.8 P, 156.8 CF; 425/DIG. 29, 110, 112, 123, 500

[56] References Cited

U.S. PATENT DOCUMENTS 3,521,973  7/1970  Schouw ..................... 29/156.8 CF

FOREIGN PATENT DOCUMENTS 202694  7/1956  Australia ..................... 425/DIG. 29

Primary Examiner—Francis S. Husar
Assistant Examiner—John S. Brown
Attorney, Agent, or Firm—Reising, Ethington, Barnard, Perry & Brooks

[57] ABSTRACT

Impellers for ventilators are manufactured from fibre-reinforced synthetic plastics material by forming a flat base disc of resin impregnated fibres on a suitable support and forming notches around the periphery of the base disc. The portions of the batt adjacent the notches are bent upwardly or downwardly over suitable supports on which are laid further pieces of resin impregnated fibre to form the impeller blades. A cover plate, also of resin impregnated fibres can be applied to the free edges of the impeller blades to complete the impeller.

One moulding apparatus for carrying out the method has a notched flat plate with supporting walls extending downwardly from the plate adjacent the notches. The base disc of the impeller is laid on the flat plate and the supporting walls serve as supports for the blades. Another moulding apparatus for carrying out the method comprises a hollow mould and inwardly extending supporting walls. A slit impeller base disc can be placed on the base of the hollow mould and the pieces of impregnated batt for the blades can be laid on the supporting walls.

7 Claims, 13 Drawing Figures

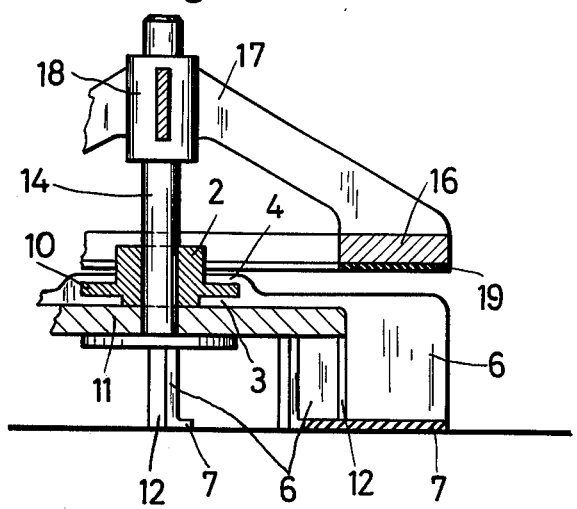
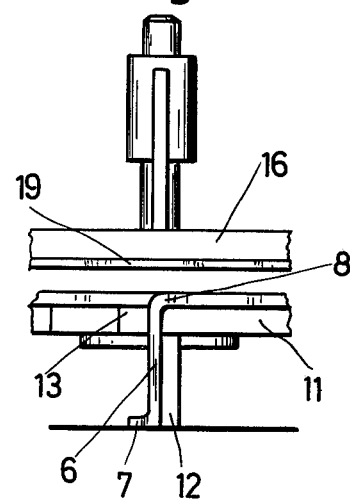
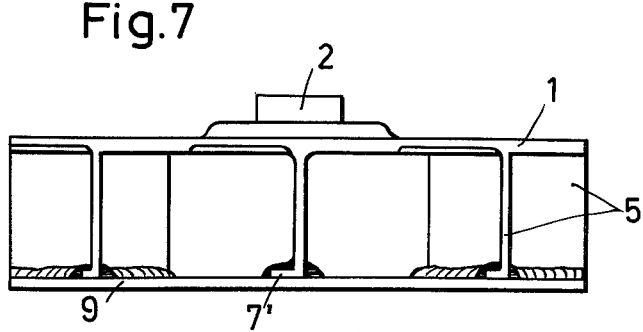

APPARATUS FOR FORMING FANS

The invention relates to a method and apparatus for manufacturing impellers for ventilators more particularly an impeller which comprises a flat circular base disc having a hub, an annular cover plate which is disposed coaxially with and spaced from this base disc and impeller blades which are disposed between the base disc and the cover plate and are firmly connected to them and are uniformly distributed over the periphery.

Whilst it was once usual to make ventilator impellers from metal, impellers are now made more often from synthetic plastics material to increase resistance to corrosion and for use in gas and air mixtures having corrosive constituents.

Such impellers made from thermo-plastics synthetic materials are however generally only suitable for use at temperatures up to approximately 80° C. and for peripheral speeds of 50 m/sec maximum.

The use of impellers made from hardenable synthetic materials which are reinforced by the inclusion of glass fibres or the like has previously caused considerable difficulties owing to the complicated shape of ventilator impellers.

The aim of the invention is to provide a method of manufacturing an impeller from fibre-reinforced synthetic material (i.e. resin-impregnated fibres) and in so doing in particular to enable the production of such impellers with the required complicated shapes of the guide blades and cover plates.

The present invention provides a method of making an impeller for a ventilator in which a flat circular base disc and impeller blades are moulded as a single unit by hand from fibre reinforced, age hardening fluid synthetic plastics material, the impeller blades being supported on one side over their entire surface by suitably shaped supporting walls, then the gaps which may have arisen in the base disc between the impeller blades are closed by fibre reinforced, age hardening fluid synthetic plastics material, and in which, after hardening of the synthetic plastics material and removal of the supporting walls, this base disc integrally provided with the impeller blades, is connected by the free ends of the impeller blades to an annular cover plate which is similarly formed from fibre reinforced, age hardening fluid synthetic plastics material, and finally after hardening is complete the external and internal edges of the ventilator impeller are turned.

As supporting walls, suitably shaped squares or blocks made of a hard material may be used which, as is usual in the processing of such synthetic materials, may be coated superficially with a parting agent so that the hardened synthetic material may be again detached from these supporting walls.

Should an imbalance remain in the finished impeller as a result of differing wall thicknesses, this may be eliminated by grinding or adding additional material.

Depending upon the synthetic material used and the manufacturing skill employed, the impellers produced by this method may be used in temperatures above 80° C. and at peripheral speeds up to 100 m/s and above.

Preferably a hub is embedded in the base disc when the latter is moulded. This may be effected, for example, by placing the hub on a glass fibre batt impregnated with age hardening fluid synthetic plastics material and having a central opening, the radially projecting edge of the hub which is provided with notches, grooves or the like engaging over the batt and by placing one or more additional glass fibre batts impregnated with age hardening fluid synthetic plastics material thereover.

The invention includes moulding apparatus for carrying out the method, which apparatus comprises a flat plate which forms a support for a base disc of the impeller and which has on its underside supporting walls which corresponds in size, shape and number to the impeller blades to be formed, said plate having a notch next to each supporting wall, each notch extending over the entire radial depth of the adjacent supporting wall and having a circumferential width is so dimensioned to enable the impeller blades to be moulded from fibre-reinforced, age hardening fluid synthetic plastics material integrally with the base disc, also of fibre-reinforced, age hardening fluid synthetic plastics material.

A glass fibre batt can be placed over the base plate so as to completely cover the cut-outs which are sufficiently wide to enable radial notches to be made in the impregnated fibre batt and the parts of the fibre batt adjacent thereto limited in a peripheral direction can be bent downwards and placed against the supporting walls. Additional fibre material impregnated with synthetic material is then placed on these bent-over edges, and extends up to the base of the support and can be bent in that region into foot parts of differing widths. Such apparatus enables rapid and uniform production of ventilator impellers using the method according to the invention.

A mandrel for holding and guiding the hub to be embedded in the base disc is preferably fixed in the centre of the base plate perpendicularly thereto.

The apparatus can be provided with a circular counter-plate having a single or multi-part holder with a central bush by which the counter-plate is slidably received on the mandrel. The radial dimensions of the counter-plate are so selected that, when placed on the lower base plate, it covers its cut-outs.

After the base plate has been so formed with the impeller blades thereon, the counter-plate may then be covered on its underside with a glass fibre batt, which is simultaneously impregnated with age hardening fluid synthetic plastics material, and is then lowered with this batt on to the base plate having the impeller blades already formed thereon. In so doing, the annular glass fibre batt is connected to the base plate and the integrally formed impeller blades and simultaneously covers the interstices which are located between successive impeller blades above the cut-outs in the lower plate of the apparatus.

The invention also includes moulding apparatus for carrying out the method comprising a hollow mould whose base forms the support for a base disc of the impeller and from whose side wall supporting walls project inwardly, these supporting walls extending to the base of the mould and serving as a support for fibre-reinforced fluid synthetic plastics material for forming the impeller blades integrally with the base disc also of fibre-reinforced fluid synthetic plastics material.

This apparatus may be provided with a central ejector so that the base plate provided with impeller blades may be removed from the hollow mould after hardening of the synthetic plastics material. Furthermore, the side walls of the hollow mould may be slightly tapered to facilitate opening of the mould.

The invention is further described hereinafter with reference to the accompanying drawings, in which:

FIG. 5 is a detail section through the apparatus shown in FIG. 2, showing glass fibre batts introduced and a hub inserted;

FIG. 6 is a side view of a part of the apparatus of FIG. 5 with the glass fibre batts inserted;

FIG. 7 is a side view of the ventilator impeller shown in the plan view of FIG. 1;

Figure 1:
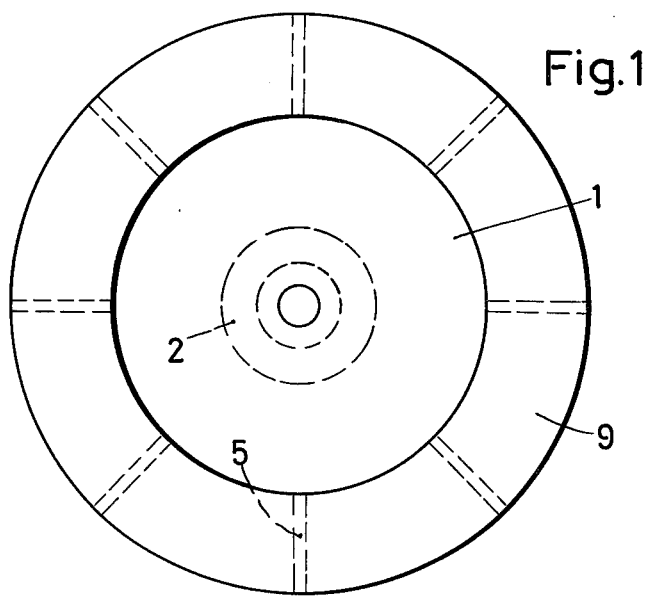
FIG. 1 is a plan view of a ventilator impeller.
Figure 4A:
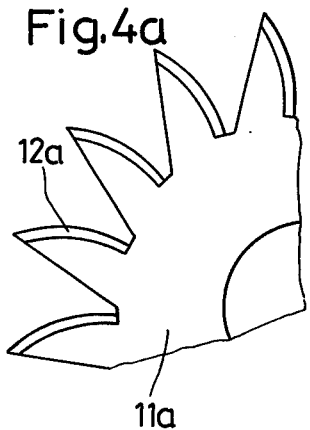
FIGS. 4a to 4c are detail views, similar to FIG. 3, but showing differently shaped impeller blades.
Figure 4B:
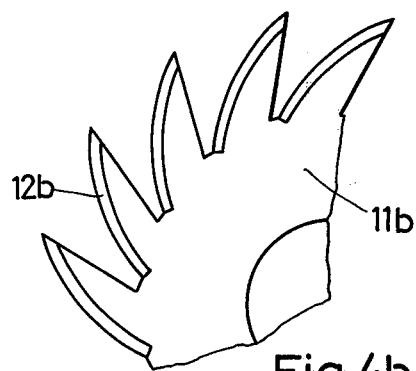
Figure 4C:
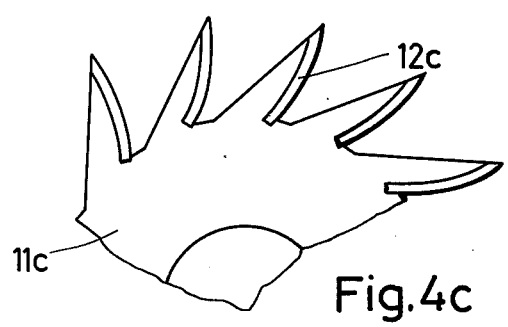

For reasons of simplicity, the ventilator impeller shown in FIGS. 1 and 7 is shown with flat, radially extending impeller blades 5 in order to be able to describe the method and the apparatus more easily with this simplified form. In practice, such shapes and arrangements of the impeller blades are rarely met. Rather, curved impeller blades, such as are indicated in FIGS. 4a, 4b, and 4c, are generally used.

The ventilator impeller comprises a circular base disc 1 in the centre of which is disposed a hub 2 firmly connected to the base disc. At a distance from the base disc 1 is an annular cover plate 9 and, between this and the base disc, there are several impeller blades 5 which are uniformly distributed about the periphery and are firmly connected on the one hand to the base disc and on the other hand to the cover plate. The base disc 1, the cover plate 9 and the impeller blades 5 are made from resin impregnated glass fibre and the hub 2 is made of metal.

Figure 2:
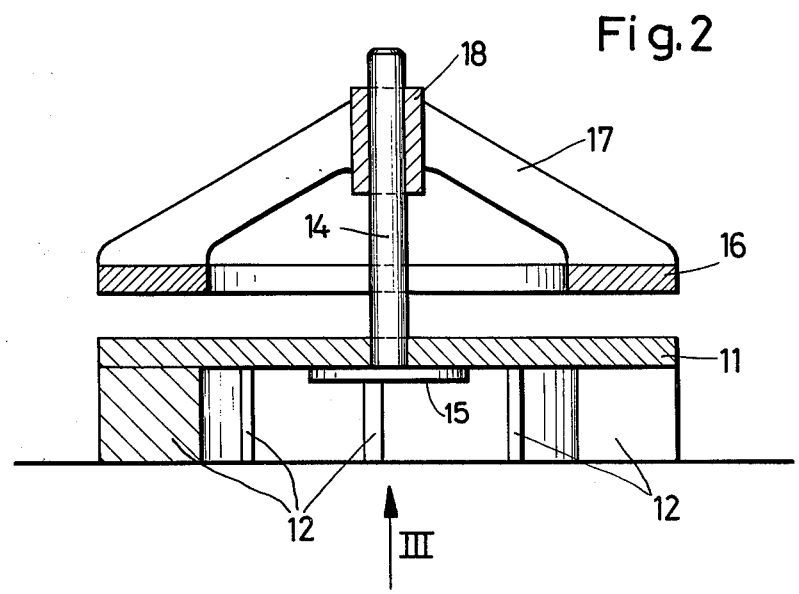
FIG. 2 is a section along the line II—II of FIG. 3 through apparatus for manufacturing a base plate provided with impeller blades.
Figure 3:
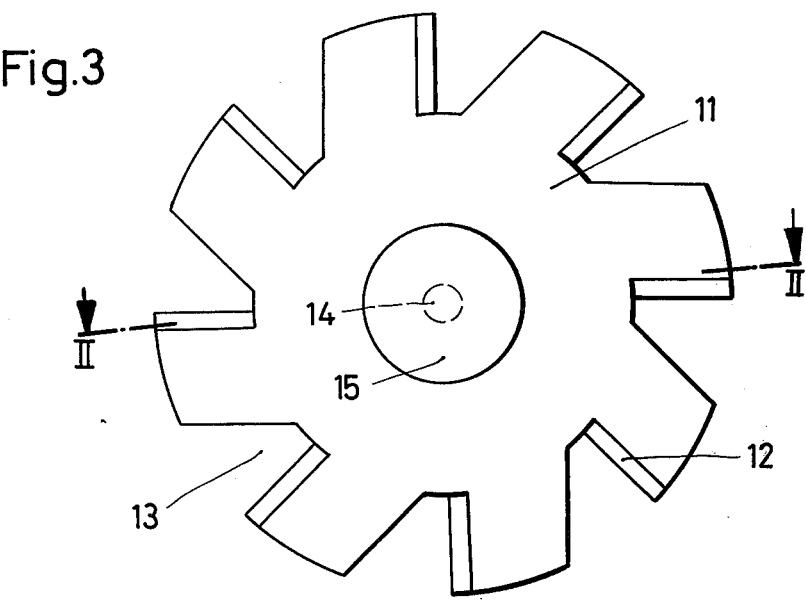
FIG. 3 is a view in the direction of the arrow III of FIG. 2 with a counter-plate removed.

The apparatus shown in FIGS. 2 and 3 has a mould which comprises a base plate 11 on whose underside supporting walls 12 are disposed, these supporting walls being uniformly distributed about the periphery and being firmly connected to the plate 11.

As can be seen from FIG. 3, the base plate 11 has a cut-out 13 next to each supporting wall 12, the purpose of the cut-outs 13 being described hereinafter. As may also be seen from FIG. 2, the lower free ends of the supporting walls 12, which project from the underside of the plate, rest on a support, for example a table or plate without being firmly connected thereto.

A mandrel 14 serving to guide an annular counter-plate 16 is fixed in the centre of the plate 11 and extends perpendicular to the plate 11. A plate 15 on the lower end of the mandrel 14 is secured to the lower side of plate 11. The annular counter-plate 16 is connected by a holder 17 comprising four radially disposed arms to a bush 18 and is movably guided on the mandrel 14 by this bush.

The manufacture of a ventilator impeller using the above-described apparatus is as follows:

Firstly, the annular counter-plate 16 with the holder 17 and the bush 18 is removed. Then a circular glass fibre batt having a central opening for the mandrel 14 is placed on the plate 11. The external diameter of this batt approximately equals the external diameter of the plate 11. Impregnation with fluid synthetic plastics material is effected by application to the mould before the glass fibre batt is placed in position and to the batt so placed.

The batt is then slit from its edge at those edges of the cut-outs 13 opposite the supporting walls 12 and is pressed downwards against the supporting walls 12. Additional pieces of glass fibre batt are then placed in an overlapping manner on the supporting walls 12 and are long enough for their lower ends 7 to be against the support table or the like, as shown in FIGS. 5 and 6.

As FIG. 5 shows, the hub 2 which is usually made of metal is then placed on the mandrel 14 and moved into the position shown in FIG. 5, a lower shoulder of the hub 2 projecting into the suitably dimensioned central opening of the lower circular glass fibre batt. A radially projecting flange 10 of the the hub 2 overlaps this lower end 3. One or more additional glass fibre batts 4 are then placed thereon so as to overlap the above-mentioned flange 10 of the hub and extend outwardly to the periphery of the plate 11 and are similarly impregnated with age hardening fluid synthetic plastics material.

An annular glass fibre batt 19 is placed on the annular counter-plate 16 and is also impregnated with age hardening fluid synthetic plastics material. Provided that the synthetic material has not yet hardened, this batt clings to the counter-plate 16. The counter-plate is then moved into the position shown in FIG. 5 by placing the bush 18 on the mandrel 14.

The counter-plate 16 is pushed further downwards until the annular glass fibre batt 19 rests on the previously assembled glass fibre parts and covers the recesses which arose at the cut-outs 13 of the plate 11.

After hardening of the synthetic plastics material, the counter-plate 16 with the bush 18 is removed and the semi-finished product comprising the hub 2 and the parts connected thereto of glass fibre reinforced synthetic plastics material is drawn upwards from the plate 11.

The semi-finished product is placed with the bent ends 7 in engagement with an annular cover plate made from glass fibre batts which are similarly impregnated with age hardening synthetic plastics material and this cover plate 9 is similarly hardened.

Finally the inner and outer peripheries of the impeller are turned on a lathe or the like and the impeller is balanced, if necessary.

In practice, the impeller blades 5 are generally not flat and do not extend radially but have a curved shape corresponding approximately to that of FIGS. 4a, 4b and 4c. This being the case, the supporting walls 12 of the device are suitably shaped.

Figure 8:
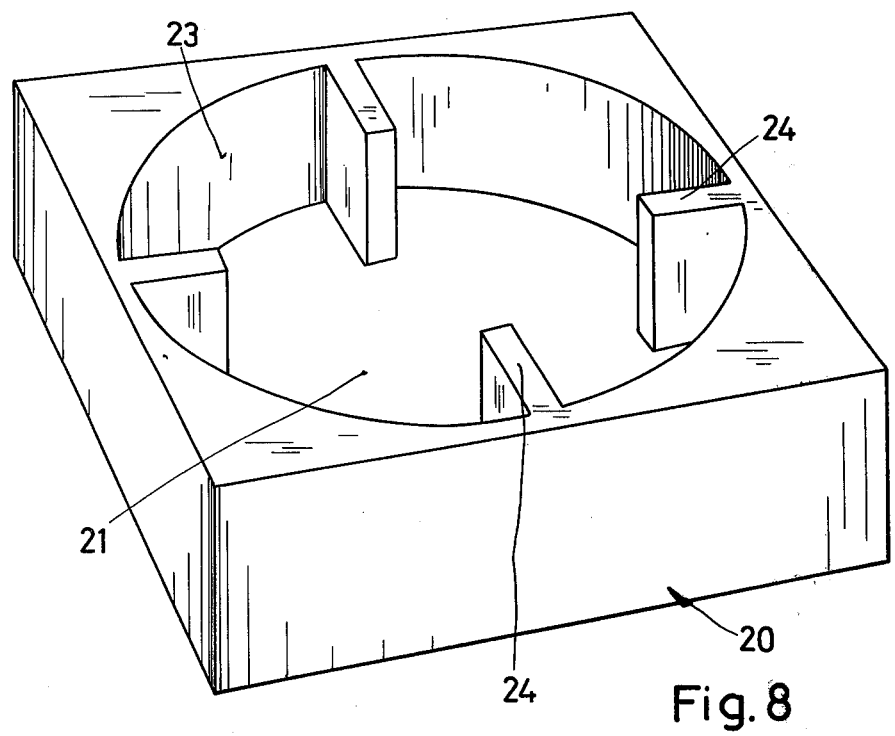
FIG. 8 is a perspective view of another apparatus.
Figure 9:
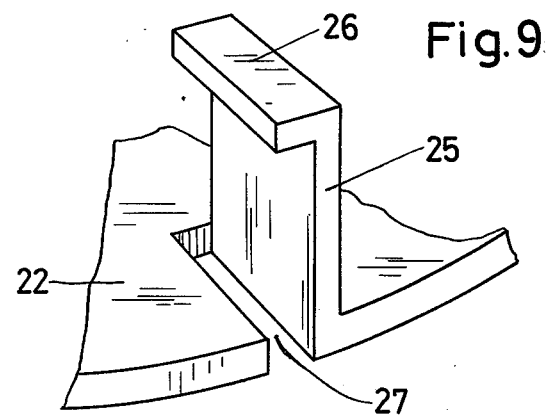
FIG. 9 is a perspective fragmentary view of a base plate manufactured in the apparatus of FIG. 8 and showing one impeller blade.

The apparatus shown in a simplified diagrammatical form in FIG. 8 unlike the apparatus of FIGS. 1 to 6, is a hollow mould 20 which has a base plate 21 as a support for a base disc 22 (FIG. 9) to be moulded. Supporting walls 24 project inwardly from side wall 23 of the hollow mould, these supporting walls extending to the base of the mould and serving as a support for forming impeller blades 25. When working with this hollow mould, a circular disc 22 made from glass fibre batt is used to cover the base and notches 27 for receiving the supporting walls 24 are cut from the periphery of this disc. The inserted glass fibre batt is again impregnated with age hardening fluid synthetic plastics material. Pieces are then cut from glass fibre batt and are placed with their central part laterally on the supporting walls 24, while the lower ends are bent over and are placed against the base disc 22 located on the base 21, and the edge 26 which projects upwardly beyond each supporting wall 24 is bent over and rests on the top surface of the supporting wall. After hardening, the body formed in the mould 20 is removed from the mould. FIG. 9 shows a detail of this body. The notches 27 are then closed by inserting age hardening fluid synthetic plastics material, preferably again reinforced by glass fibres. If required, this glass fibre reinforced synthetic plastics body may be placed on a circular disc of glass fibre reinforced synthetic plastics material and may be hardened jointly thereto.

Figure 10:
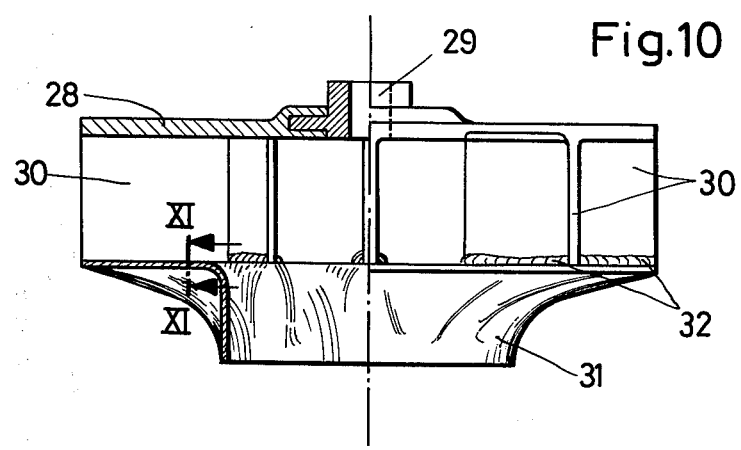
FIG. 10 is a side view, partially sectioned, of a modified form of a ventilator impeller similar to that of FIG. 7.
Figure 11:
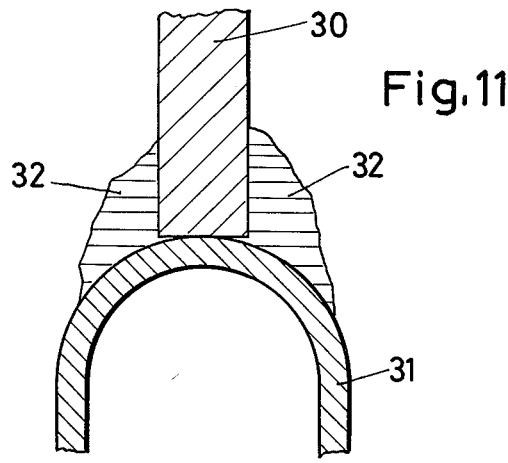
FIG. 11 is a fragmentary section, to a larger scale, along the line VI—VI of FIG. 10.

FIG. 10 is a side view partially in section of a modified ventilator impeller in which the cover plate 31 is funnel shaped. In this case too, the basic body of the ventilator impeller comprising the hub 29 having a base disc 28 and impeller blades 30 is produced using the method and apparatus described above. A funnel shaped cover plate 31 is then manufactured in the desired form, possibly using a suitable mould, from glass fibre reinforced synthetic plastics material. To provide an airtight connection to the impeller blades 30, the funnel shaped cover plate 31 is pleated or fluted at the impeller blades 30 in such a manner that the upper edges of the pleats are in contact with the lower edges of the impeller blades 30 as is shown in FIG. 11. The connection of the impeller blades 30 to the pleats of the cover plate 31 is then effected by the additional application of age hardening fluid synthetic plastics material 32 which is then similarly left to harden.

I claim:

1. Apparatus for use in making a fibre-reinforced synthetic plastics impeller having a base disc and a plurality of impeller blades projecting axially from one surface of said base disc; said apparatus comprising a flat support plate to provide support for said base disc and a hollow member projecting from said support plate to define a cavity there-above, said member having supporting walls elongated in a radial inward direction, said supporting walls having smooth side surfaces, said supporting walls corresponding in size, shape and number to the impeller blades to be formed, peripheral notches defined between each adjacent pair of side surfaces of said supporting walls, each notch extending over the entire radial depth of at least one of the associated supporting walls and having a width in the peripheral direction so dimensioned to permit moulding of impeller blades from fibre reinforced, age hardening fluid synthetic material on the supporting walls integrally with a base disc on said flat plate.

2. Apparatus according to claim 1 wherein said supporting walls project from the underside of said support plate.

3. Apparatus according to claim 1 wherein said supporting walls project from the upper surface of said support plate and are enclosed by an annular side wall, said supporting walls projecting radially inwardly from said side wall.

4. Apparatus for use in making a fibre-reinforced synthetic plastics impeller having a base disc and a plurality of impeller blades projecting axially from one surface of said base disc; said apparatus comprising a flat support plate to provide support for said base disc and supporting walls projecting from said support plate, said supporting walls corresponding in size, shape and number to the impeller blades to be formed, peripheral notches defined between each adjacent pair of said supporting walls, each notch extending over the entire radial depth of at least one of the associated supporting walls and having a width in the peripheral direction so dimensioned to permit moulding of impeller blades from fibre reinforced, age hardening fluid synthetic material on the supporting walls integrally with a base disc on said flat plate, and said apparatus further comprising a mandrel which is fixed centrally in said flat plate and extends perpendicular thereto for holding and guiding a hub to be moulded in said base disc of said impeller.

5. Apparatus according to claim 4 further comprising a circular counter-plate having holder means including a central bush adapted to be slidably received on said mandrel, the radial dimensions of said counter-plate being so selected that, when placed on said flat plate it overlies said notches therein.

6. Apparatus for use in making a fibre-reinforced synthetic plastic impeller having a base disc and impeller blades, comprising a hollow mould having a base to provide support for said base disc and having a side wall to define a cavity there-above said base, said hollow mould having supporting walls having smooth side surfaces defining notches therebetween, said supporting walls projecting and elongated in an inwardly direction from said side wall and extending to said base of the hollow mould to provide support for fibre reinforced fluid synthetic plastics material for forming said impeller blades integrally with said base disc.

7. Apparatus for use in making a fibre-reinforced synthetic plastic impeller having a base disc and a plurality of impeller blades projecting substantially perpendicularly from one side of the base disc and each spaced radially from each other and extending in the direction from the center of the base disc toward the outer periphery thereof, said apparatus comprising: means defining a flat support plate for supporting a fibre batt corresponding in size and shape to the base disc; a plurality of impeller supporting walls for supporting fibre segments corresponding in size and shape to the impeller blades, said impeller supporting walls each having an axial length corresponding to the axial length of the impeller blades for supporting fibre material for forming the impeller blades; a mandrel fixed to the center of the base plate and extending perpendicularly therefrom; an annular counter-plate slidably mounted on said mandrel for movement toward and away from said base plate; said counter-plate being removably slidably mounted on said mandrel.

* * * * *